United States Patent
Liang et al.

(10) Patent No.: US 11,762,112 B2
(45) Date of Patent: Sep. 19, 2023

(54) METHOD OF OBTAINING SEISMIC WHILE DRILLING SIGNAL

(71) Applicant: Institute of Geology and Geophysics, Chinese Academy of Sciences, Beijing (CN)

(72) Inventors: Yao Liang, Beijing (CN); Xueliang Li, Beijing (CN); Shoudong Huo, Beijing (CN); Xuhui Zhou, Beijing (CN); Shuyang Zhang, Beijing (CN)

(73) Assignee: Institute of Geology and Geophysics, Chinese Academy of Sciences, Beijing (CN)

(*) Notice: Subject to any disclaimer, the term of this patent is extended or adjusted under 35 U.S.C. 154(b) by 27 days.

(21) Appl. No.: 17/989,359

(22) Filed: Nov. 17, 2022

(65) Prior Publication Data

US 2023/0161060 A1   May 25, 2023

(51) Int. Cl.
*G01V 1/28*   (2006.01)
*G01V 1/18*   (2006.01)

(52) U.S. Cl.
CPC .............. *G01V 1/181* (2013.01); *G01V 1/28* (2013.01); *G01V 2210/1429* (2013.01); *G01V 2210/32* (2013.01)

(58) Field of Classification Search
CPC ... G01V 1/181; G01V 1/28; G01V 2210/1429; G01V 2210/32
See application file for complete search history.

(56) References Cited

U.S. PATENT DOCUMENTS

2013/0215717 A1* 8/2013 Hofland et al. ......... G01V 1/288
  367/59
2013/0265851 A1* 10/2013 Faber et al. ............. G01V 1/42
  367/25

FOREIGN PATENT DOCUMENTS

| CN | 101749011 A | 6/2010 | |
|---|---|---|---|
| CN | 103576189 A | 2/2014 | |
| CN | 104678427 A | 6/2015 | |
| CN | 113396341 A | 9/2021 | |
| WO | 2007056278 A2* | 5/2007 | ............... G01V 1/003 |
| WO | 2008154640 A1* | 12/2008 | ............... G01V 1/28 |

* cited by examiner

*Primary Examiner* — Krystine E Breier
(74) *Attorney, Agent, or Firm* — Nitin Kaushik

(57) ABSTRACT

The present disclosure discloses a method of obtaining a seismic while drilling signal. The method comprises the following steps: arranging geophones by using a first observation method to obtain a first seismic reference signal and a second seismic reference signal; arranging geophones by using a second observation method to obtain first seismic data; arranging geophones by using a third observation method to obtain second seismic data; comparing the first seismic reference signal with the second seismic reference signal to obtain a first output reference signal, and optimizing the first output signal to obtain a second output reference signal. The present disclosure obtains square matrix and near-wellhead seismic while drilling data through the combination of geophone square matrix combined observation, near-wellhead observation, and survey line observation, the data acquisition efficiency is relatively high, the signal-to-noise ratio is high, and thus, the problem of near-surface noise interference is effectively solved.

6 Claims, 1 Drawing Sheet

METHOD OF OBTAINING SEISMIC WHILE DRILLING SIGNAL

CROSS-REFERENCE TO RELATED APPLICATIONS

The application claims priority to Chinese patent application No. 2021113943901, filed on Nov. 23, 2021, the entire contents of which are incorporated herein by reference.

TECHNICAL FIELD

The present disclosure relates to the technical field of a seismic exploration method, and in particular relates to a method of obtaining a seismic while drilling signal.

BACKGROUND

A Seismic while drilling is a new borehole seismic method developed in recent years. It is a technique for evaluating formation characteristics after various processing of a drill bit vibration signal collected on a drill stem and a drill bit signal collected on an earth surface survey line by using the vibration generated when a drill bit breaks rock as an underground seismic source in the process of oil drilling. During drilling, seismic waves generated by drill bit drilling can be observed more efficiently by using a drill bit source for earth surface observation; geophones are arranged on the earth surface for recording by using the rock breaking vibration of the drill bit as the source; and velocity update and advanced prediction are realized by imaging processing. Seismic while drilling data processing usually comprises signal extraction, velocity update, advanced prediction and the like, among which obtaining effective seismic while drilling signals is the basis of subsequent processing.

At present, the seismic while drilling signal is received by a conventional grid observation or a survey line method. The received signal is greatly affected by near-surface noise, and the signal-to-noise ratio is often low, which makes it difficult to realize seismic imaging while drilling. As it is only observed on the earth surface, for horizontal drilling, sometimes it is difficult for reflected waves of a geological body in front of the drill bit to reach the ground surface, and it is difficult to predict the seismic signal.

The extraction of effective direct wave signals is the key premise for a seismic while drilling imaging technology. The current method usually uses near-surface noise suppression to obtain clearer seismic while drilling direct waves, or finally determines the sequences of the seismic while drilling direct waves according to the change of cross-correlation magnitude of multi-channel seismic data. The method is greatly influenced by an observation system: and with the improvement of a drilling technology, a drill bit source signal is getting weaker and weaker, so it is inaccurate to obtain the information of the drill bit source by near-surface noise suppression and conventional cross-correlation methods.

In conclusion, the existing method of obtaining the seismic while drilling signal still has the above-mentioned defects. It is of great application value and market demand to develop a combined observation method and collect the direct wave information of the drill source.

SUMMARY

The present disclosure provides a method of obtaining a seismic while drilling signal, which is used for solving problems that signals and data obtained in the prior art are greatly influenced by noise, and have low accuracy, and obtaining more effective and accurate seismic while drilling signals.

The present disclosure discloses the method of obtaining a seismic while drilling signal, comprising the following steps:
- S1. arranging geophones by using a first observation method to obtain a first seismic reference signal and a second seismic reference signal;
- S2. arranging geophones by using a second observation method to obtain first seismic data;
- S3, arranging geophones by using a third observation method to obtain second seismic data;
- S4, comparing the first seismic reference signal with the second seismic reference signal to obtain a first output signal, and optimizing the first output signal to obtain a second output signal;
- S5. processing the second seismic data to obtain first output data; and
- S6. obtaining direct wave travel time according to the first output data, the second output signal and the first seismic data.

In a .preferred embodiment, in the step S1, the first seismic reference signal has a more obvious oscillation starting signal than the second seismic reference signal, the second seismic reference signal is less affected by noise than the first seismic reference signal, and preferably, the first observation method is a near-wellhead observation method; and the geophone is a moving coil type geophone, or a piezoelectric geophone or other types of geophones used in seismic exploration, and further preferably, the geophone may be a node geophone.

In a preferred embodiment, in the step Si-, the arrangement interval of the geophones is determined according to actual observation environments, and preferably, the second observation method is a survey line observation method; the arrangement interval is determined according to actual observation environments, specifically according to the attenuation of wave propagation in an underground medium, if the attenuation is relatively slow, the dominant frequency of aseismic wave signal is relatively high, the geophone interval should be reduced, otherwise it will be increased; and further preferably, the arrangement interval can be set to 10-30 m.

In a preferred embodiment, in the step S3, the third observation method can be used for near surface noise suppression and effective signal extraction, preferably, the third observation method is the geophone concentric circle combined observation method, and further preferably, the third observation method is a square matrix observation method.

In a preferred embodiment, the comparison of the signal-to-noise ratios of the first seismic reference signal and the second seismic reference signal are also comprised in the step 4; preferably, if the signal-to-noise ratio of the first seismic reference signal is high, the first output signal is the first seismic reference signal; if the signal-to-noise ratio of the second seismic reference signal is high, the first output signal is the second seismic reference signal; and if the signal-to-noise ratios of the first seismic reference signal and the second seismic reference signal are low, the first output signal is the sum of the two.

In a preferred embodiment, in the step S4, the optimization further comprises deconvolution processing.

In a preferred embodiment, processing the second seismic data by a near-surface noise suppression technology is also comprised in the step S5.

In a preferred embodiment, processing the first output data and the first seismic data to obtain a signal matrix is also comprised in the step S6.

In a preferred embodiment, performing cross-correlation processing on the second output signal and the signal matrix is also comprised in the step G.

In a preferred embodiment, the cross-correlation processing can be realized in a time domain or in a frequency domain.

The present disclosure discloses the method of obtaining a seismic, while drilling signal, which has the following beneficial effects:

the square matrix and near-wellhead seismic while drilling data is obtained by optimizing an observation system through the combination of geophone square matrix combined observation, near-wellhead observation (drilled well walls, platforms or borehole-areas near drilled wells) and survey line observation; and thus, on one hand, the data acquisition efficiency is greatly improved, and the problem of noise suppression in the data acquisition process of known methods is solved. On the other hand, geophone signals near wellheads and square matrix signals are used for realizing the information extraction of seismic while drilling direct waves, and the travel time information of a drill bit signal to the wellhead geophone is effectively obtained.

BRIEF DESCRIPTION OF DRAWINGS

In order to describe the technical solutions in the present disclosure or the prior art more clearly, the drawings required to be used in the description of the embodiments or the prior art will be briefly introduced below. It is apparent that the drawings described below are only some embodiments of the present disclosure. Those of ordinary skill in the art may further obtain other drawings according to these drawings without creative work.

DETAILED DESCRIPTION OF THE EMBODIMENTS

Figure 1:
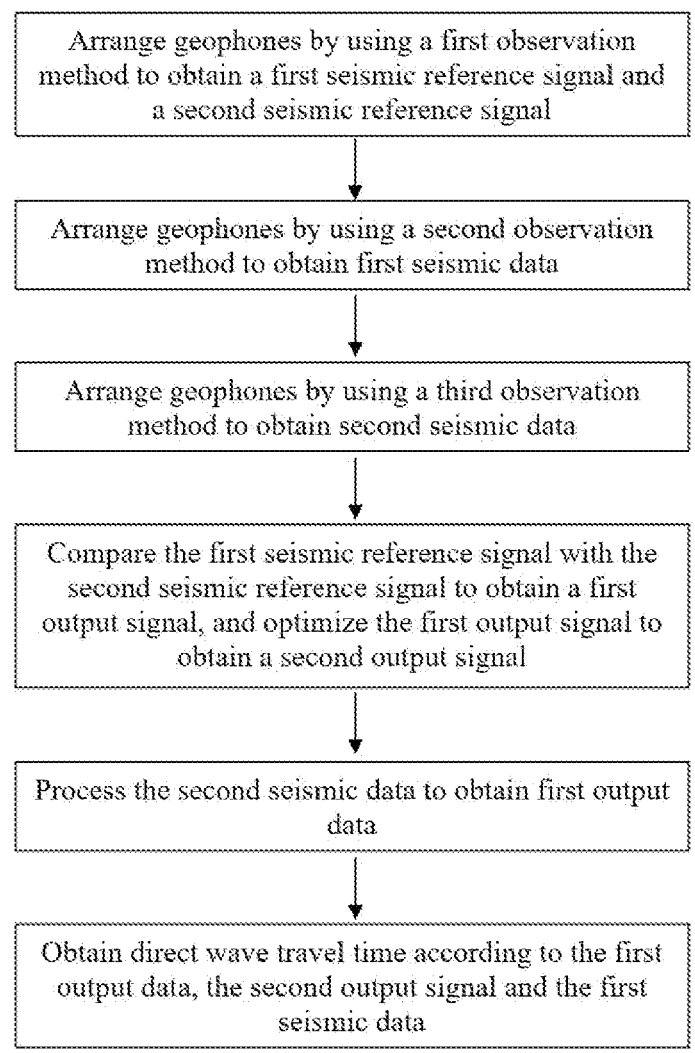
FIG. 1 is a schematic flowchart of a method of obtaining a seismic while drilling signal according to the present disclosure.

The method of the present disclosure will be further described in detail with reference to the accompanying drawings and embodiments of the present disclosure.

It is to be noted that the embodiments of the present application and the features in the embodiments may be combined without conflict. The present disclosure will now be described in detail with reference to the drawings in combination with embodiments.

It should be noted that terms used herein are only for describing specific implementations and are not intended to limit exemplary implementations according to the present application. As used herein, the singular form is also intended to include the plural form unless the context clearly dictates otherwise. In addition, it should further be understood that, terms "include" and/or "comprise" used in this specification indicate that there are features, steps, operations, devices, components, and/or combinations thereof.

It should be noted that the terms "first", "second", and the like in the specification and claims of the present application and the foregoing drawings are used to distinguish similar objects and do not necessarily describe a specific sequence or order. It should be understood that the data used in this way can be interchanged under appropriate conditions, so that the embodiments of this application described herein can be implemented in a sequence other than those illustrated or described herein. In addition, the terms "include", "comprise" and any other variations are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

The present embodiment provides a method of obtaining a seismic while drilling signal. FIG. 1 is a flowchart of a method of obtaining a seismic while drilling signal according to the present disclosure, which comprises the following steps:

S1, arranging geophones by using a first observation method to obtain a first seismic reference signal and a second seismic reference signal. As the second seismic reference signal is less affected by noise than the first seismic reference signal, the first seismic reference signal has a more obvious oscillation starting signal than the second seismic signal. The first seismic reference signal is specific, The first observation method comprises the steps of firstly arranging the geophones next to well walls to obtain the first seismic reference signal, then digging pits with a depth of 10-20 m at near-well positions (within 5 meters), and arranging the geophones in the pits to obtain the second seismic reference signal.

The geophone here may be a moving coil type geophone, or a piezoelectric geophone or other types of geophones used in seismic exploration and is used for obtaining a seismic wave signal; preferably, the geophone may be a node geophone; further, the geophones in specific frequency bands are selected according to the dominant frequency of seismic waves generated by a drill bit source and earth surface conditions; preferably, a 10 Hz single-component (Z-component) geophone is used; if the earth surface is relatively soft and the seismic waves attenuate seriously, a geophone with a lower frequency is needed; and preferably, a 5 Hz single-component (Z-component) geophone is used.

S2. arranging geophones by using a second observation method to obtain first seismic data.

The second observation method is a survey line observation method. The arrangement interval of the geophones is determined according to actual observation environments, and preferably, the arrangement interval is set to 10-30 m. The arrangement interval is determined according to actual observation environments, preferably, the direction of a survey line can be determined according to the projection of the well trajectory on the earth surface, and then the geophones can be successively arranged according to the direction. Specifically, the arrangement interval is determined according to the attenuation of wave propagation in an underground medium. Further, if the attenuation is relatively slow, the dominant frequency of a seismic wave signal is relatively high, the geophone interval should be reduced, otherwise it will be increased.

S3, arranging geophones by using a third observation method to obtain second seismic data.

The third observation method is a geophone concentric circle combined observation method, and further, the third observation method is a square matrix observation method. The geophone square matrix can be a 10*10-15*15 square matrix, so that the obtained data is more accurate. The third observation method can also be used for near-surface noise suppression and effective signal extraction.

S4, comparing the first seismic reference signal with the second seismic reference signal to obtain a first output signal, and optimizing the first output signal to obtain a second output signal.

Specifically, the step S4 further includes:

comprising the signal-to-noise ratios of the first seismic reference signal and the second seismic reference signal. If the signal-to-noise ratio of the first seismic reference signal is high, the first output signal is the first seismic reference signal; if the signal-to-noise ratio of the second seismic reference signal is high, the first output signal is the second seismic reference signal; and if the signal-to-noise ratios of the first seismic reference signal and the second seismic reference signal are low, the first output signal is the sum of the two, The first output signal is optimized to obtain the second output signal. The optimization here is deconvolution processing, and the output signal after optimization eliminates the attenuation influence of seismic waves, has relatively high effective frequency bands, and can provide more high-frequency seismic wave information.

S5. processing the second seismic data to obtain first output data.

The second seismic data is processed by adopting a near-surface noise suppression technology, and on the basis of the above processing, deconvolution compression wavelet processing is performed to obtain the first output data with a high signal-to-noise ratio.

S6, obtaining direct wave travel time according to the first output data, the second output signal and the first seismic data.

Specifically, the step S6 further includes:

processing the first output data and the first seismic data to obtain a signal matrix. Here, the first output data and the first seismic data generate a two-dimensional signal matrix $R1(\dot{x},t)$, $\dot{x}$, represents a position, and t represents the time of signal recording.

Cross-correlation processing is performed on the second output signal and the signal matrix to obtain the direct wave travel time. Cross-correlation processing is realized in a time domain or a frequency domain to obtain a cross-correlation result C. The time position of the extreme value in the cross-correlation result is the direct wave information time difference $\Delta_T$, and the time difference represents the propagation time difference of X1(t) and $R1(\dot{x},t)$, and is the difference between the time when the drill bit source propagates along the well rules to the wellhead, and the time when the drill bit source propagates along the underground medium to the earth surface geophone.

Before and after $t_0$, in order to obtain more accurate take-off time of the direct, wave, the data is inverted as follows:

using X1(t) as a seismic wavelet and seismic data, performing 0-norm sparse inversion, and the objective function is:

$$obj = \sum \left( R1(\dot{x},t) - X1(t)*r \right)^2 + \lambda C(r \neq 0)$$

Where R is the result data of inversion, t is time, C(r(t)) is a counting function, which represents the number of non-zero values of the inversion result, and λ is a user-defined parameter.

The obtained r can be used for extracting fine signals, and the direct wave information time difference Δ T is obtained.

Then, calculate the travel time of prorogation along the drilled well: by the known length L of a drill stem and the propagation velocity V of the wave along the drill stem, calculate the time of the drill bit source propagating to the earth surface along the drill stem as follows:

$$t_0 \int_0^R dL/v$$

Where n is the number of the drill stem.

According to the time of the drill bit source propagating to the earth surface along the drill stem, the travel time from the drill bit source to the earth surface geophone is $T = t_n + \delta t$.

The square matrix and near-wellhead seismic while drilling data is obtained by optimizing an observation system through the combination of geophone square matrix combined observation, near-wellhead observation (drilled well walls, platforms or borehole-areas near drilled wells) and survey line observation. On one hand, the data acquisition efficiency is greatly improved, and the problem of noise suppression in the data acquisition process of known methods is solved. On the other hand, geophone signals near wellheads and square matrix signals are used for realizing the information extraction of seismic while drilling direct waves, and the travel time information of a drill bit signal to the wellhead geophone is effectively obtained.

Through the description of the above implementations, those skilled in the art can clearly understand that each embodiment may be implemented by means of software plus a necessary general hardware platform, of course, hardware can also be used. Based on such understanding, the essence of the above technical solution or parts making contributions to the prior art. may be embodied in the form of a software product, and the computer software product, may be stored in computer-readable storage media such as ROM/RAM, magnetic, disks, optical disks, etc., including instructions for enabling a computer device (which may be a personal computer, a server, or a network device, etc.) to perform the methods described in the various embodiments or some parts of the embodiment.

It should be illustrated finally that, the above embodiments are only used for illustrating the technical solutions of the present disclosure, and are not intended to limit the present disclosure; although the present disclosure is illustrated in detail with reference to the foregoing embodiments, it should be understood by those skilled in the art that, modifications may still be made on the technical solutions written by the foregoing embodiments, or equivalent replacements are made on part of technical features; and these modifications or replacements do not make the essence of the corresponding technical solutions depart from the spirit and scope of the technical solution of the various embodiments of the present disclosure.

What is claimed is:
1. A method of obtaining a seismic while drilling signal, comprising the following steps:
S1, arranging geophones by using a first observation method to obtain a first seismic reference signal and a second seismic reference signal;
S2, arranging geophones by using a second observation method to obtain first seismic data;
S3, arranging geophones by using a third observation method to obtain second seismic data;
S4, comparing the signal-to-noise ratios of the first seismic reference signal and the second seismic reference signal to obtain a first output signal; if the signal-to-noise ratio of the first seismic reference signal is high, the first output signal is the first seismic reference signal; if the signal-to-noise ratio of the second seismic reference signal is high, the first output signal is the second seismic reference signal; and if the signal-to-noise ratios of the first seismic reference signal and the second seismic reference signal are low, the first output signal is the sum of the two; and optimizing the first output signal to obtain a second output signal by deconvolution processing;

S5, processing the second seismic data to obtain first output data; The second seismic data is processed by adopting a near-surface noise suppression technology, and on the basis of the above processing, deconvolution compression wavelet processing is performed to obtain the first output data with a high signal-to-noise ratio;

S6, obtaining direct wave travel time according to the first output data, the second output signal, and the first seismic data; the first output data and the first seismic data generate a two-dimensional signal matrix; obtaining direct wave travel time according to performing cross-correlation processing on the second output signal and the signal matrix to obtain the direct wave travel time;

wherein the first observation method comprises the steps of firstly arranging the geophones next to well walls to obtain the first seismic reference signal, then digging pits at near-well positions, and arranging the geophones in the pits to obtain the second seismic reference signal;

the second observation method is a survey line observation method; and the third observation method is a geophone concentric circle combined observation method.

2. The method of claim 1, wherein in the step S1, the first seismic reference signal has a more obvious oscillation starting signal or drilling stopping signal than the second seismic reference signal, and the second seismic reference signal is less affected by noise than the first seismic reference signal.

3. The method of claim 1, wherein in the step S2, the arrangement interval of the geophones is determined according to actual observation environments.

4. The method of claim 1, wherein in the step S3, the third observation method can be used for near-surface noise suppression and effective signal extraction.

5. The method of claim 1, wherein processing the second seismic data by a near-surface noise suppression technology is also comprised in the step S5.

6. The method of claim 1, wherein the cross-correlation processing can be realized in a time domain or in a frequency domain.

* * * * *